Dec. 23, 1969   B. W. ENGLE   3,484,947
THERMOHUMIDISTAT
Filed April 1, 1968   3 Sheets-Sheet 1
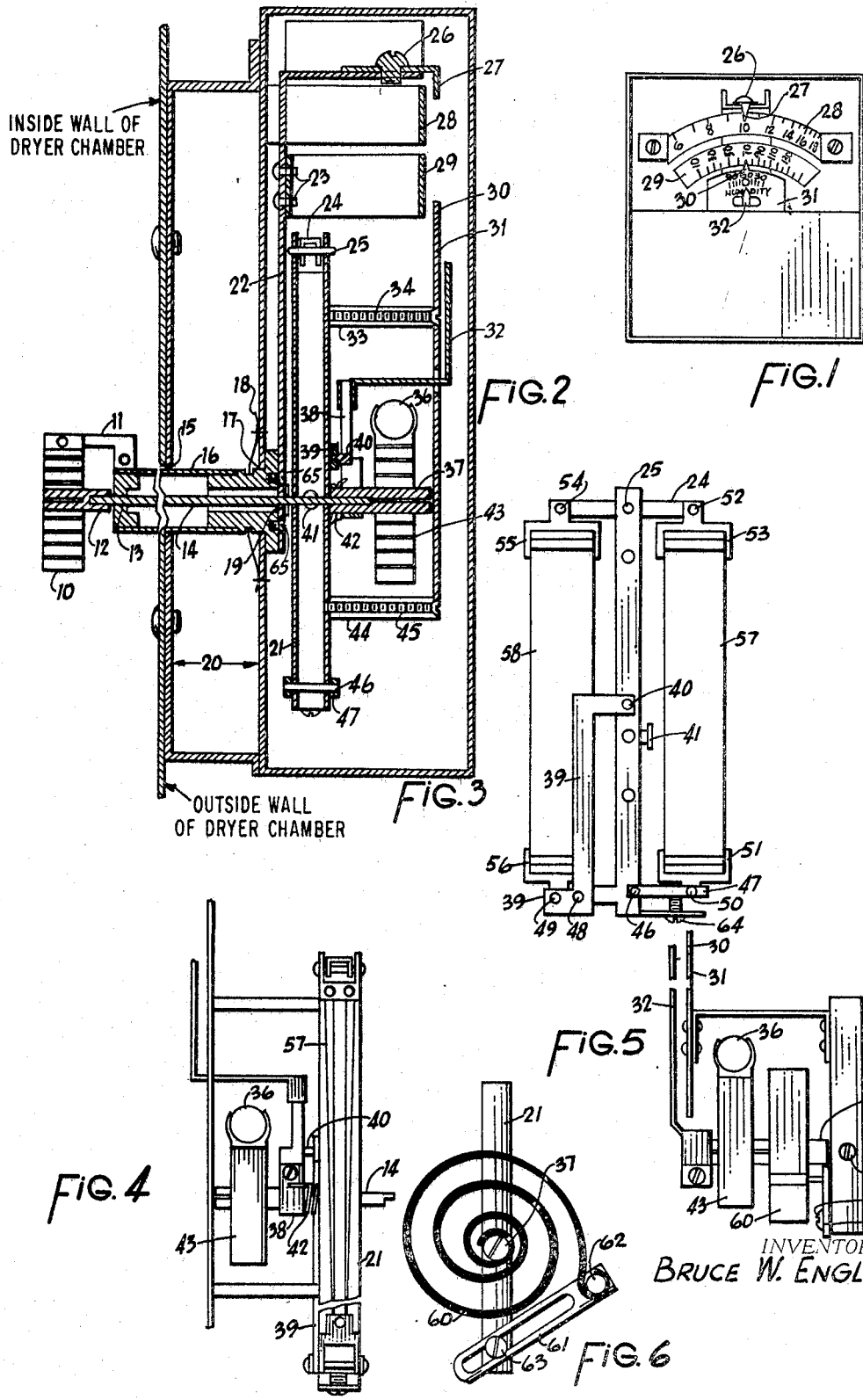
INVENTOR.
BRUCE W. ENGLE Dec. 23, 1969 — B. W. ENGLE — 3,484,947
THERMOHUMIDISTAT
Filed April 1, 1968 — 3 Sheets-Sheet 2
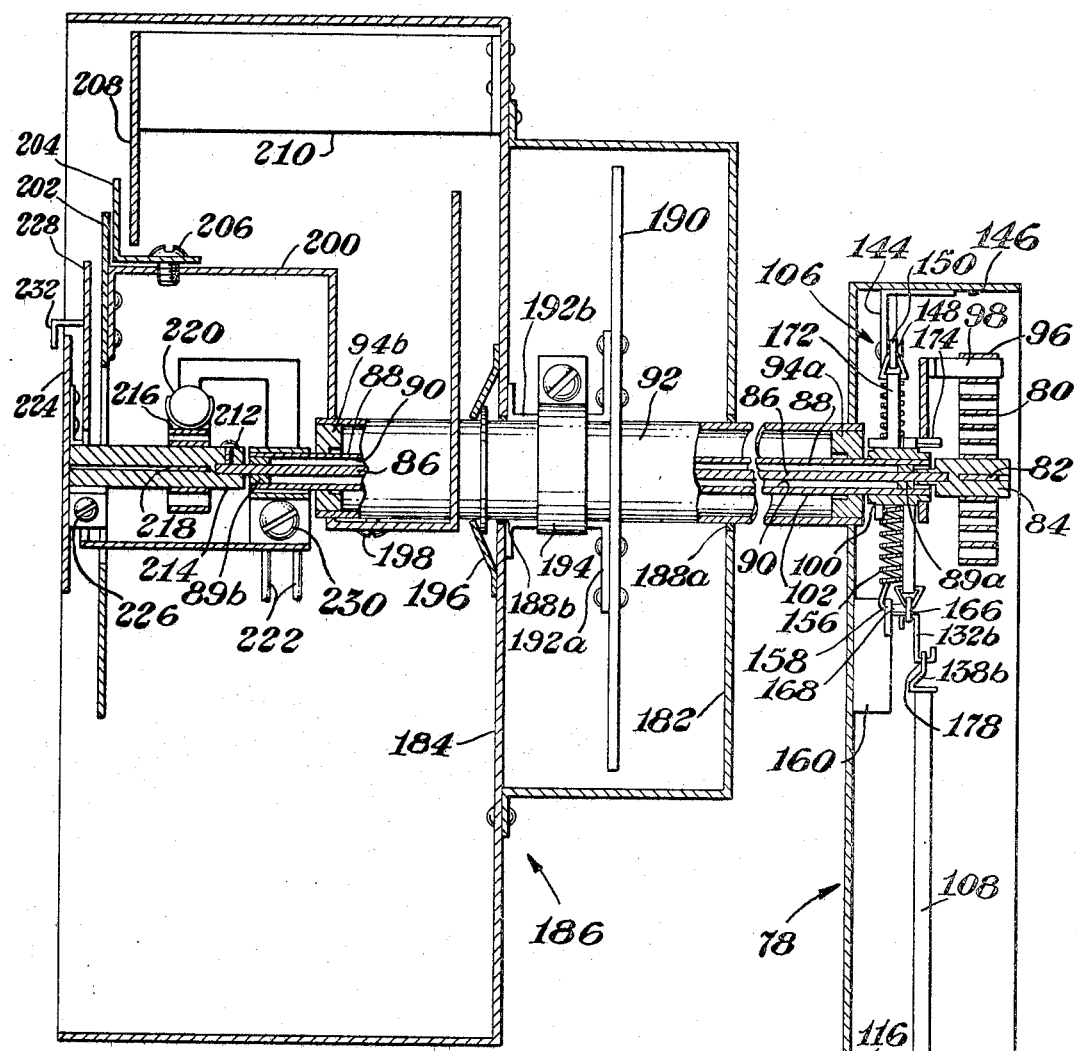
Fig. 7
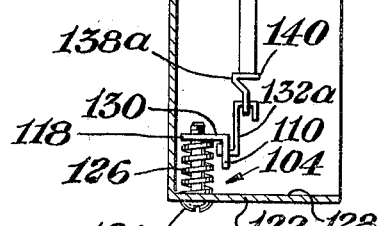
INVENTOR.
Bruce W. Engle
BY
C. Kenneth Bjork
AGENT Dec. 23, 1969  B. W. ENGLE  3,484,947
THERMOHUMIDISTAT
Filed April 1, 1968  3 Sheets-Sheet 3

INVENTOR.
Bruce W. Engle
BY
C. Kenneth Bjork
AGENT

United States Patent Office 3,484,947
Patented Dec. 23, 1969

3,484,947
THERMOHUMIDISTAT
Bruce W. Engle, 315 Summer St., Box 146,
West Burlington, Iowa 52601
Continuation-in-part of application Ser. No. 626,615,
Mar. 28, 1967. This application Apr. 1, 1968, Ser.
No. 723,648
Int. Cl. F26b 19/00
U.S. Cl. 34—48                                                       7 Claims

ABSTRACT OF THE DISCLOSURE

A dryer heater control having two temperature sensitive elements and a humidity sensitive element coupled to operate a switch connected to control a drying air heater so that regardless of changes in atmospheric temperature and humidity a product will be dried to a desired moisture content.

Background of the invention

This application is a continuation-in-part of patent application Ser. No. 626,615, filed Mar. 28, 1967, now abandoned.

The control of forced hot air heaters and other heating means used to dry a manufactured or natural product or material to a predetermined moisture content in the presence of varying atmospheric conditions of temperature and humidity heretofore has been achieved only with difficulty. To illustrate, crop dryer manufacturers conventionally supply separate humidistats and thermostat assemblies for controlling the heaters employed in such dryers but these must be used singly or in tandem and do not provide close and precise control of the required or desired moisture content in a product being dried thereby. Since the heat required to dry grain, for example, to a given final moisture content varies with the temperature and humidity of the air, to assure that the optimum temperature is maintained during the drying operation by the heater, the control instrument must analyze such changes in the atmosphere and correspondingly control the operation of the heater.

Crop drying, especially of shelled corn, is being practiced on a rapidly increasing scale not only in this country but in other grain producing countries of the world. This practice is strongly recommended by agriculture extension services of various states. Also, grain bin manufacturers extol the money saving values of early harvest and crop drying. However, to assure the optimum in yield of the dried product, one must guard against excess loss of weight from overdrying which can more than offset the added profit realized by early harvest. Overdrying of grain crops through lack of proper temperature and humidity controls for crop dryers is a common problem to the users of such dryers.

It is a principal object of the present invention to provide an apparatus suitable for controlling the heat output of a forced air heater of a dryer so as to maintain a predetermined final moisture content in a product being dried in the dryer even under varying atmospheric temperature and humidity conditions.

It is also an object of the present invention to provide a novel temperature and/or humidity activated heater control unit which is compact and readily installed in a crop or other forced air dryer.

These and other objects and advantages of the present invention readily will become apparent from the detailed description presented hereinafter when read in conjunction with the drawings.

Brief description of the drawings

FIGURE 1 is a front view of one embodiment of the heater control apparatus of the present invention showing the instrument box of the apparatus which in use is positioned outside of the plenum chamber of a dryer.

FIGURE 2 is a side elevation sectional view of the heater control apparatus used with the instrument box shown in FIGURE 1.

FIGURE 3 is a front view of one embodiment of a humidity control member used in the present invention.

FIGURE 4 is a side elevation of the humidity control member of FIGURE 3.

FIGURE 5 is a side elevation of another embodiment of a humidity control member suitable for use in the heater control apparatus of the present invention.

FIGURE 6 is a front elevation of the humidity control member shown in FIGURE 5.

FIGURE 7 is a side sectional elevation of a second embodiment of a heater control apparatus of the present invention.

Summary

Figure 8:
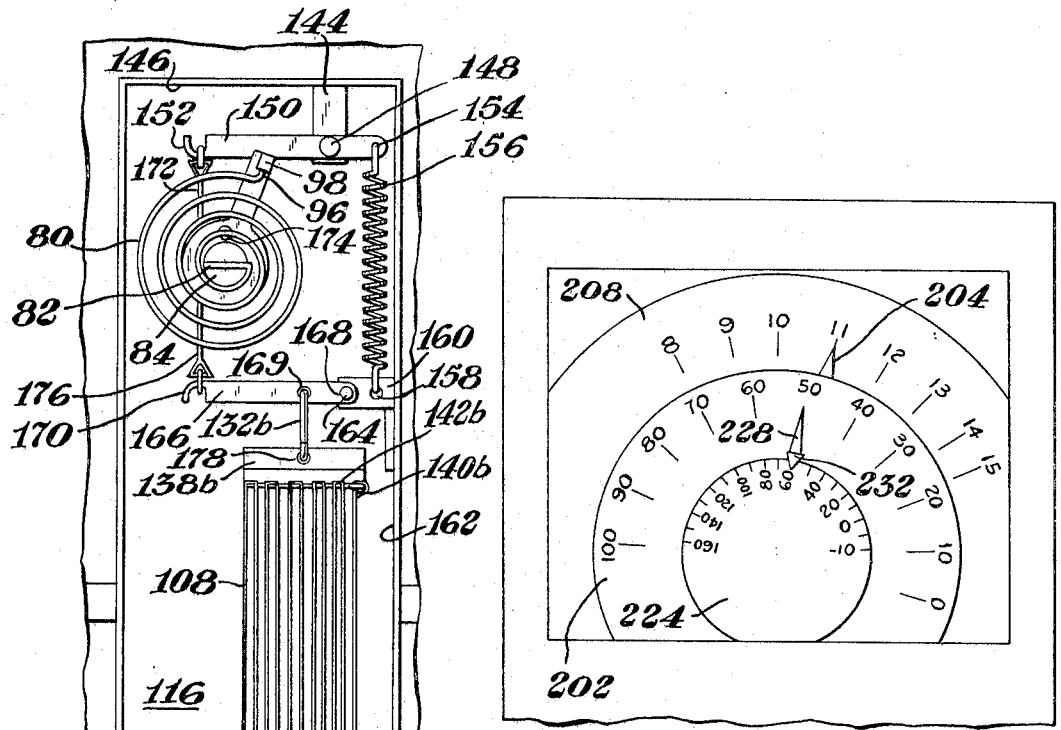
FIGURE 8 is a fragmentary front elevation of the instrument control box of the embodiment of FIGURE 7.

In general the heater control apparatus of the present invention comprises one humidistat and two thermostats connected to a single displacement type switch such as a mercury switch, for example, which is connected to a control circuit of a heater. The humidistat and two thermostats are interconnected in such a manner that they can move either independently or in unison with very low resistance to movement. One thermostat, which is very sensitive to small and/or rapid changes in temperature is positioned near the rear of the apparatus. The second thermostat, which is less sensitive to temperature fluctuations, is positioned near the front of the control apparatus. The humidistat is positioned in the apparatus intermediate the thermostats. The rear thermostat and humidistat in turn are connected to scaled markers and to a moisture indexing indicator which can be set to indicate a predetermined moisture content in a product or material being dried.

The instrument initially is calibrated by controlling and correlating the relationship of the movements of both thermostats and the humidistat such that regardless of the rise and fall of the atmospheric temperature and humidity and equilibrium temperature is accurately maintained within the dryer at any given desired predetermined moisture content setting of the instrument. Further, the graduations on the humidity scale and inside bin temperature scale are spaced at predetermined intervals such that at all settings they reflect the equilibrium temperature at a given moisture content setting. For a given product this can be achieved by referring to established tables listing these relationships as given in various state and federal government agriculture department publications. See, for example, Iowa State University Cooperative Extension Service Bulletin No. 313 where on page 3, Table 2, the effect of drying air temperature and relative humidity on the final moisture content of shelled corn is tabulated.

In using the control apparatus of the present invention to regulate a heater of a bin dryer, for example, to provide a predetermined moisture content in a product being dried, the unit is positioned so that the first thermostat is within a dryer plenum chamber and the second is outside the dryer. Depending on the particular design configuration of the apparatus, the humidistat is positioned either inside or outside of the drying chamber. The moisture indexing indicator is set so that its pointer is at a mark on the moisture content scale corresponding to a desired final moisture content in the product being dried Because of the predetermined calibration of the apparatus, no further adjustment is necessary. The control apparatus now takes over control of the heater for the dryer. Regardless of the rise and fall of the atmospheric temperature and relative humidity, it will control the heat output of the heater as required or drying, and, correspondingly provide the optimum drying temperature content of the product being dried to that value indicated on the scale of the indicator and precisely controlling the moisture content of the product at this level.

In an actual drying operation using the present control apparatus with a grain dryer, the system operates according to the following principles as set forth on pages 3 and 4 of the Iowa State University Cooperative Extension Service Bulletin #313. These principles are:

(1) Raising the temperature of drying air 20 degrees F. decreases the relative humidity of the air approximately one-half.

(2) The temperature and relative humidity of the drying air determine the final moisture content of product being dried, e.g. a grain such as shelled corn.

(3) There is a direct interrelationship of drying air temperature and humidity, e.g. atmospheric conditions, and moisture content of grain being dried. To illustrate, the graph of FIG. 2, page 4 of the bulletin shows that air at 30 degrees F. and 80 percent relative humidity must be heated 13 degrees to provide a grain product having a final desired moisture content of 12–13 percent Air originally at 70 degrees F. and 80 percent relative humidity, on the other hand, must be heated only 7 degrees to get the same results. Therefore, it is readily apparent that as the temperature of the ambient air rises, a smaller temperature differential is required at a given humidity to maintain an equilibrium drying temperature.

To illustrate the operation of the claimed heater control apparatus in a typical grain drying operation, a blower of a grain bin crop dryer runs continuously forcing ambient air through a heater and air duct into the plenum chamber of the dryer; then upward through the perforated floor and grain in the bin finally being vented through port holes in the roof.

A thermo-humidistat unit as shown in FIGURE 2, for example, is mounted on the outside wall of the plenum chamber so that the temperature and humidity sensing elements in the instrument box will respond to changes in the ambient air. The response of these elements can be further accelerated by providing air vents in the instrument box. With the thermo-humidistat mounted on the outside wall of the plenum chamber, the rear thermostat 10 extends into the plenum chamber where it is constantly exposed to changes in the plenum chamber air. The mercury switch 36 in the instrument box is connected in series with the electric circuit to a solenoid gas valve of the heater. When this switch is closed or opened it operates the solenoid valve thereby permitting the fuel, e.g. liquid petroleum gas, to flow into or be cut off from the heater.

When the sensing elements in the instrument box (i.e. the thermostat and the humidistat) determine that heat must be added to the ambient air, to bring the grain to the selected moisture content, the mercury switch closes thereby energizing the electric circuit to the solenoid gas valve, permitting gas to flow to the heater.

As the heated air enters the plenum chamber it activates the thermostat 10 on the rear of the instrument until its expansion turns the operating shaft 14 sufficiently to upset the mercury switch 36. This breaks the electric circuit to the solenoid valve causing the gas to be cut off. The heat is now completely shut off, but the cooler ambient air continues to flow into the plenum chamber since the blower runs continuously.

Now the plenum chamber air cools, causing thermostat 10 to contract and turn operating shaft 14 in the reverse direction upsetting the mercury switch and closing the circuit to the solenoid gas valve, thereby again turning on the heat. This cycle of operation is repeated over and over again.

This cycle of operation is constantly monitored by the sensing elements in the instrument box. These sensing elements being constantly exposed to ambient air will raise or lower the temperature of the plenum chamber air by the opening or closing of the mercury switch in response to either temperature or humidity changes of the ambient air. The temperature from which this variation, as mentioned directly hereinafter, occurs is determined by the manual selection of the moisture content, as follows: When the moisture selector is moved, it rotates both thermostats and the humidistat. So when moved to a lower moisture content, the mercury switch will be closed, calling for heat. How much heat will be determined by how low a moisture content is selected. If the selector is moved to a higher moisture content, the mercury switch will be opened and the heat shut off until the cooler ambient air forced in by the blower cools the plenum chamber air sufficiently to cause thermostat 10 to cycle the heater so the air in the plenum chamber is maintained at the lower temperature.

Thus, briefly in summary:

The rear thermostat 10 maintains within close limits the temperature of the plenum chamber air as determined by the sensing elements and the moisture content selection from the instrument box. This is its sole function.

The sensing elements in the instrument box (i.e. the thermostat and the humidistat) independently or in unison raise or lower the plenum chamber temperature in response to changes in the ambient air. A rise in temperature or a rise in humidity call for a rise in plenum chamber temperature. These sensing elements are so calibrated that, regardless of changes of temperature or humidity of the ambient air, they will maintain an equilibrium drying temperature in the plenum chamber to dry the grain to whatever moisture content is selected.

The average temperature differential between the plenum chamber and the ambient air is determined by the manual positioning of the moisture content selector.

By such precise and accurate control of the heater, overdrying of a product, e.g. a grain crop, is eliminated in spite of atmospheric temperature and humidity fluctuations.

Description of preferred embodiments

One preferred embodiment of the heater control apparatus of the present invention is illustrated by FIGURES 1–4. In this depicted embodiment the perimeter of a first thermostat 10 is held stationary by bracket 11 which is clamped to housing 16. The center of thermostat 10 is firmly anchored to operating shaft 14 through hub 12. Operating shaft 14 is supported by, and turns in, bearings at 13 and 19. Indexing lever 22 is fastened to the end of housing 16 by two machine screws 65. Movement of indexing lever 22 rotates housing 16 in its bearings 15 and 17 in the walls of the instrument box 20. Flat spring 18 holds the housing 16 in place.

Humidity frame 21 is firmly anchored to operating shaft 14 by set screw 41. Therefore when thermostat 10 expands or contracts, it rotates, by means of operating shaft 14, both the humidistat 21 and thermostat 43, thereby upsetting mercury switch 36. The lower end of humidity detecting element 57 is fastened to positioning lever 47 by bracket 51 and bearing pin 50. The other end of positioning lever 47 is fastened to frame 21 by bearing pin 46. Positioning lever 47 is adjustable by machine screw 64. The upper ends of humidity detecting elements 57 and 58 are fastened to equalizing lever 24 by brackets 53 and 55 through bearing pins 52 and 54. Equalizing lever 24 is supported in frame 21 by bearing pin 25.

The lower end of humidity element 58 is fastened to actuating lever 39 through bracket 56 and bearing pin 49. Actuating lever 39 is fastened to frame 21 by bearing pin 48. Thermostat 43 is firmly anchored to hub 37 which has a free fit on operating shaft 14. Bracket 38 is clamped to hub 37, and humidity pointer 32 is clamped to bracket 38. Coil spring 42 holds bracket 38 against pin 40 in actuating lever 39 thereby keeping all slack out of the linkage. As humidity elements 58 and 57 expand or contract, thermostat 43 is rotated on operating shaft 14 by means of actuating lever 39, thereby upsetting mercury switch 26. Thermostat 43, by expanding or contracting, will also independently upset mercury switch 36.

The humidity scale is on face plate 31. The "inside bin temperature" pointer 30 projects from this face plate. Face plate 31 is firmly anchored to frame 21 by two machine screws 34 and 45 extending through tubes 33 and 44. Inside bin temperature scale 29 is riveted to indexing lever 22 so that it moves with the lever. Moisture content scale 28 is fastened stationary to the instrument box 20. Moisture content pointer 27, which is adjustable, is anchored to indexing lever 22 by machine screw 26.

In the alternate humidity control of FIGURES 5 and 6, a humidistat coil 60 is substituted for the humidity detecting tape elements 57 and 58. The inner end of the coil is connected to hub 37 and the outer end to pin 62 on slotted linkage 61. The length of the effective linkage can be varied by moving the slot to desired position under screw 63 in frame 21. This arrangement performs the same function as previously described of revolving the hub 37 to register humidity changes.

Installation of this apparatus is made by bolting the instrument box to the outside wall of the drying bin plenum chamber, the rear portion being inside the bin. Usually, this places thermostat 10 about 3 inches into the plenum chamber. The other thermostat 43 and the humidistat 21 are located in the instrument box which is mounted on the outside of the plenum chamber.

As indicated hereinbefore and shown in the drawings, the two thermostats 10 and 43 and humidistat 21 are mechanically interconnected so that any one of these can, independently, or in unison with one or both of the others, activate and deactivate the mercury switch thereby engaging or disengaging the electric circuit to the heater.

The thermostat 43 inside the instrument box is selected to exhibit less movement for a given temperature change, i.e. be less sensitive to temperature fluctuations, than thermostat 10 positioned in the plenum. This assures that as the outside temperature falls the plenum temperature falls at a less rapid rate.

To set the "thermo humidistat" to regulate the heater, the indexing lever 22 is moved until the pointer 27 is over the desired moisutre content mark on the scale 28. This indexing lever moves the housing 16 in its bearings 15 and 17 and rotates both thermostats and the humidistat. This causes mercury switch 36 to engage the electric circuit to the heater. As the temperature builds up in the plenum chamber, thermostat 10 turns the operating shaft 14 to upset the mercury switch 36 and break the electric circuit to the heater. Thus, the initial temperature increase in the plenum chamber is determined by the moisture setting of the instrument and the outside temperature and humidity of theair. After the initial temperature rise, the plenum temperature is governed entirely by the thermostat 43 and humidistat 21 in the instrument box. Thermostat 43 monitors the plenum temperature in accordance with the rise and fall of the atmospheric temperature, but since it is selected to have less movement than thermostat 10 it also increases the temperature differential as the temperature falls and decreases it as the temperature rises. The humidistat 21 responds to changes in the humidity of the outside air and converts these into temperature changes thereby modifying the action of the thermostat 43.

As the outside temperature or humidity rises or falls, thermostat 43 and the humidistat 21, therefore, will, independently or in unison, upset mercury switch 36 to make or break the electric circuit to the heater, thereby maintaining the proper temperature at all times to dry the grain or product being dried in the dryer to a desired predetermined moisture content.

The accuracy of this instrument can be checked at any time by letting the drying fan run without heat until the plenum chamber temperature is the same as the outside temperature. Check this temperature and the humidity indicated on a table from a bulletin of the type indicated hereinbefore. These readings are converted directly to a given moisture content in the product being dried. Now, starting at the maximum moisture content, move the indexing lever or pointer until the switch is activated and the heater begins operation. If the instrument is properly adjusted, the moisture indicating pointer should be at a moisture content the same as specified in the standard table or chart.

Figure 9:
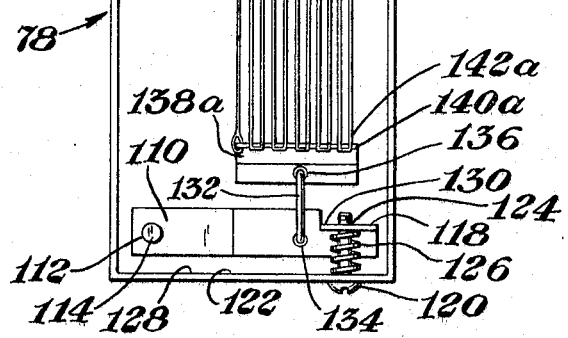
FIGURE 9 is a fragmentary rear elevation of the embodiment shown in FIGURE 7.

A second preferred embodiment of the control instrument of the present invention as shown in FIGURES 7–9 is similar to the apparatus described hereinbefore except that the humidistat is positioned so as to be inside a drying bin, for example, during operation.

In this embodiment an open back closed sided frame 78 contains a coil-type thermostat 80. The inner end 82 of thermostat 80 is affixed to a retainer hub 84 which in turn is attached to one end of an elongated shaft 86. Shaft 86 is positioned within a tubular member 88 held at either end of said member 88 by bearings 89a and 89b. The bearings 89a and 89b support shaft 86 so that it is free from contact with the inner wall 90 or tubular member 88 and also can freely turn within said member 88. In turn, tubular member 88 is supported within a housing 92, being held therein at each end by bearings 94a and 94b such that tubular member 88 can rotate within the hollow sleeve, i.e. housing 92. Housing 92 is attached to the front of frame 78 and extends substantially horizontally therefrom. The outer end 96 of coil thermostat 80 is held by an arm-like bracket 98. The other end of bracket 98 is fastened to a hub 100 which is firmly attached to the outside wall 102 of tubular member 88 near the end adjacent the hub 84.

Also contained within frame 78 is a humidistat assembly. This assembly, as shown in the depicted embodiment consists of a first lever-bracket unit 104 attached to frame 78 near its bottom, a second lever-bracket unit 106 attached to the top inside of frame 78, and a humidity indicating tape 108.

The lever-bracket unit 104 consists of a lever arm 110 pivotally anchored near one end by through passage 112 which passes over pivot or bearing pin 114 extending outwardly from the inside of front wall 116 of frame 78. The other end of lever arm 110 is bent over from its top for a distance along its length to form a L-shaped section 118. An adjusting screw 120 passes through the bottom 122 of frame 78 and through a mating threaded passage 124 in L-shaped section 118. Tensioning spring 126 is positioned over screw 120 between the inner face 128 of bottom 122 of frame 78 and the under side of the substantially horizontally extending leg portion 130 of L-shaped section 118. On lever arm 110 intermediate the L-shaped section 118 and passage 116—pivot pin 114 assembly is a S-shaped linkage 132 held at one end by through passage 134 in the lever arm 110. The other end of linkage 132 passes through a passage 136 substantially centered in the vertical portion of a generally L-shaped humidity tape holding bracket 138a. The horizontal portion 140 of bracket 138a contains a multiplicity of slots 142 spaced apart at intervals along its length.

Bracket 106 consists of a mount 144 fitted to the inside of top 146 of frame 78 and in front of thermostat 80. Mount 144 contains a bearing pin 148 near its lower end. Pivotably attached to pin 148 is a lever arm 150. One end of lever arm 150 is in the shape of a hook 152, or other designed fastening means. The other end of lever arm 150 contains a through passage 154. One end of a tension spring 156 is attached to lever 150 by hooking through the passage 154. Spring 156 extends downward and has its other end hooked into a through passage 158 in a second bracket 160 fastened to the inner face of side wall 162 of frame 78. Bracket 160 also contains a pivot pin 164 to which is attached lever 166 by means of a through passage 168 near one end. The other end of lever 166 contains a hook or other fastening means 170. A transmission belt 172 having one end attached to hook 152 is wrapped around hub 100 and has its other end anchored thereto by an anchor pin securing means 174. A second transmission belt 176 has its one end attached to hook 170 and is also separately wrapped around hub 100 apart and separate from belt 172. Belt 176 also is fastened to hub 100 by anchor pin 174. Lever 166 contains a through passage 168 intermediate its ends. This is positioned such that when a second tape holding bracket 138b, held by a hook 132b, is attached thereto the tape holding member 138b is substantially directly above member 138a. Ordinarily, as shown the tape holding members 138a–138b and their associated linkages are identical for ease of fabrication. Similarly, the transmission tapes or belts 172 and 176 also are the same. However, it is to be understood that if desired each of these can be of a different configuration and still provide an operable embodiment of the present invention.

A humidity sensitive tape 108 has one end affixed to an end of tape holding bracket 138a. This tape 108 is passed over adjacent slots 142a and 142b in an alternating manner in the horizontal portions 140a and 140b of brackets 138a ad 138b and has its other end affixed to bracket 138b. The number of passes of a tape 108 between brackets 138a and 138b to be employed is not critical. However, to assure a sufficiently long length of tape 108 to obtain a relatively positive dimensional change in the tape 108 with humidity changes, ordinarily a relatively large number of passes of tape 108 between brackets 138a and 138b is used. With those materials exhibiting large dimensional changes with humidity changes or where less precision is desired or required a single length of tape or a few lengths can be employed.

The humidity detecting assembly assures that as the humidity changes, and the tape 108 expands or contracts the transmission belts 172 and 176 wind or unwind on hub 100, the spring 156 keeping all slack out of the linkage and revolving hub 100 as humidity tape 108 changes dimensions. Further, as humidity tape 108 expands or contracts and transmission belts 172 and 176 turn hub 100, thermostat 80 which is affixed to bracket 98 which in turn is attached to hub 100 is rotated. As this occurs, both tubular member 88 and shaft 86 rotate simultaneously. Additionally, shaft 86 rotates independently as thermostat 80 expands or contracts.

Housing 92 passes through walls 182 and 184 of instrument box 186, being supported therein by bearings 188a and 188b respectively.

Indexing disk 190 which controls the equilibrium moisture content scale indication to indicate the desired final moisture content in a product being dried is firmly attached to the outside of housing 92 by means of brackets 192a–192b and band clamp 194. This disk is positioned within the instrument box 186 between walls 182 and 184. A friction spring 196 fitted over housing 92 on the other side of wall 184 from that adjacent disk 190 prevents end movement of said housing 92.

Attached to the end of housing 92 as by a screw 198 is a bracket 200. This bracket 200 has humidity indicating dial 202 attached thereto on the end opposite that attached to housing 92. Additionally, behind dial 202 pointing indicator 204 for indicating the equilibrium moisture content of a product being dried is fastened to bracket 200 as by a screw 206 or other fastening means. Behind pointer 204, the corresponding moisture dial 208 is attached to wall 184 of instrument box 186 by bracket 210.

The second end of shaft 86 extends outwardly through bearing 89b from tubular member 88. Affixed as by a set screw 212, or other fastening means, to this end of shaft 86 is a hub 214. A coil thermostat 216 is affixed by its inner end 218 to hub 214, usually near its connection with shaft 86. Attached to the outer end of thermostat 216 is a mercury or other type displacement switch 220 having leads 222 connected to an electrical control system for a heater (not shown).

The other end of hub 214 has attached thereto bin temperature dial 224 by means of a band screw 226, or other fastener. The humidity pointer 228 is anchored to the end of tube 88 which extends out of housing 92 through bearing 94b by means of clamp screw 230 or other clamping means. Inside bin temperature pointer 232 is firmly attached to humidity pointer 228.

In use of this apparatus, to control the drying of a grain crop, for example, the frame 78 with humidistat assembly and thermostat 80 therein is placed such that it usually extends about three inches inside the plenum chamber of the drying bin. It is apparent that housing 92 with shaft 86 and tubular housing 88 is of an appropriate length to position frame 78 at the desired distance within the plenum chamber. The instrument box 186 is fastened to the outside wall of the plenum chamber, housing 92 extending therethrough.

As indicated hereinbefore and as can be readily seen from the figures of the drawing, the two thermostats and humidistat are mechanically interconnected such that any one of these detectors can, independently or in unison with one or both of the others, activate or deactivate the mercury switch thereby engaging or disengaging the electric circuit to the heater.

In operation, the disk 190 is rotated such that the moisture indicating pointer 204 is positioned at a predetermined moisture value on indicating dial 208. Assuming that the moisture content of the ambient air is higher than that selected, switch 220 is activated thereby closing the electric circuit to the heater and thus calling for heat output. As heat energy goes into the plenum chamber of the dryer, the temperature rises and this is sensed and noted by thermostat 80 in the plenum chamber. As the temperature rises, thermostat 80 changes and turns shaft 86. When the temperature reaches the value corresponding to the setting of the moisture indicating control, the mercury switch changes position and the heater is shut off. When the temperature drops in the bin, the thermostat 80 again activates the heater as it turns shaft 86 and reactivates switch 220. This action occurs assuming that the humidistat, on the basis of the humidity present, is indicating no heat energy is being called for.

As heat enters the plenum chamber, it affects the humidity of the air since an increase in temperature always decreases its humidity. The humidistat then tends to shut off the heater thus decreasing the plenum temperature as it changes with temperature changes therein. In other words, the humidistat assembly tends to modify the action of the thermostat 80. The thermostat 80, which is selected to be sensitive to small and rapid changes of heat, will shut off the heater after an initial surge of heat, and correspondingly, temperature rise in the plenum chamber. The slower responding humidistat gradually reduces the temperature until equilibrium is achieved. Thus it can be seen that the combination of the thermostat and humidistat within the plenum chamber cooperates to monitor the incoming heated air and adjust the heater output to supply the proper heat and bin temperature to provide the predetermined moisture content in the product being dried even with variations in the atmospheric temperature and humidity.

The relationship of the movements of the thermostat 80 and the humidistat assembly are correlated such that regardless of the rise and fall of the atmospheric temperature and humidity an equilibrium temperature is accurately maintained to provide in the product being dried and predetermined moisture content for which the instrument is set. Further, the graduations on the humidity scale and inside bin temperature scale are spaced at intervals such that they reflect this equilibrium with the moisture content as listed in readily available State and Naional government agriculture extension service bulletins.

The second thermostat 216 serves to regulate the differential between the plenum temperature and the outside air.

In general, for operation of the control apparatus of the present invention as long as the relative humidity remains constant the action of the thermostats alone will vary the heater output to maintain an equilibrium temperature in the plenum chamber of a dryer at the selected final moisture desired. Should the humidity change, however, the humidistat will modify the positions of the thermostats to maintain the requisite equilibrium temperature.

The humidity sensing element for use in any embodiment of the control apparatus of the present invention can be selected from any of a variety of materials which undergo set dimensional changes with variations in humidity. Human hair, usually in plaited or braided form, can be used. This natural material, however, suffers from the disadvantage that it has a relatively small dimensional change with humidity changes and also cannot be used at higher temperatures.

One particularly suitable humidity sensing element is an oriented nylon tape sold under the trade name of Ruvea. This material, when employed in a thickness of about 0.001 inch, for example, has been found to exhibit relatively large regular dimensional changes with changes, i.e., risings and fallings, in the relative humidity of the air.

Unexpectedly, I now have found that if such a Ruvea nylon tape or similarly oriented nylon tape is treated by one of the following treatments it is possible to further markedly increase the already excellent sensitivity and dimensional changes with a given change in humidity inherently present in such a tape.

The tape can be immersed in boiling water for a period of about one minute, ordinarily from about one to about 10 minutes. The tape can then be removed from the aqueous treating bath. Alternatively, the tape can be allowed to remain in the bath for an additional period, usually of from about 10 to about 30 minutes during which time the water temperature is cooled to about 120° F. In still another modification the tape can be held in fixed position during either the treatment in boiling water or the subsequent warm water holding stage, if employed, to assure that the tape does not shrink or otherwise deform during this aqueous sensitivity promoting process.

It is to be understood that if a tape treated as set forth herein is employed in a thermo-humidistat unit, as fabricated the unit must be calibrated to account for the increase in tape sensitivity such that the actual relative humidity being measured is shown by the humidity indicator marker of the unit.

An electric relay can be incorporated into the system so that any number of adjacent heaters can be operated by a single control apparatus. Thus by placing thermometers in the plenum chambers of the adjacent bins, their heater outputs can be regulated to correspond with the temperature in the master bin containing the control apparatus.

I claim:

1. A heater control apparatus for maintaining and controlling the heat output of a heater under varying conditions of temperature and humidity which comprises in combination:
   (a) a supporting framework and instrument box assembly,
   (b) a humidistat and a first and second thermostat supported by said assembly, the first of said thermostats being positioned near the rear of said assembly and the second being positioned near the front of said assembly, said humidistat placed intermediate said thermostats,
   (c) a single displacement type switch, said humidistat and said thermostats connected to said switch, said humidistat and said thermostats also being interconnected so as to be movable both independently and in unison with low resistance to movement thereby activating and deactivating said switch as said humidistat and said thermostats move,
   (d) a rotatable moisture indexing indicator, said indicator connected by means such that both thermostats and humidistat rotate with changes in position of said indicator,
   (e) a scaled humidity indicator and a scaled temperature indicating marker in the instrument box of said assembly, said humidistat and said thermostats being connected respectively to said humidity and said temperature markers, and
       said humidistat and both of said thermostats being correlated with said moisture indexing indicator so as to provide a controlled heat output from a heater under varying conditions of temperature and humidity.

2. The heater control apparatus as defined in claim 1 wherein said first thermostat is sensitive to small temperature changes and is positioned to the rear and exterior of said instrument box and said second thermostat is less sensitive to temperature changes and is positioned in said instrument box, said single displacement switch being a mercury switch, said mercury switch being mounted on the perimeter of said second thermostat, said thermostats being attached to the opposite ends of a shaft member extending substantially from the front to the rear of said apparatus, said humidistat being attached to said shaft at a point intermediate its ends, said shaft being rotatably fastened within a hollow sleeve and extending axially therethrough, said sleeve joining said framework and said instrument box, and, said hollow sleeve having said moisture indexing indicator affixed thereto, said sleeve being fastened to said framework such that as said moisture indexing indicator is moved both of said thermostats and said humidistat are rotated.

3. The apparatus as defined in claim 2 wherein the humidistat is positioned in said instrument box, and said humidistat rotates said second thermostat on the end of said shaft member.

4. The apparatus as defined in claim 1 wherein the humidity detecting element of said humidistat consists of at least one oriented nylon humidity sensitive tape, said tape undergoing dimensional changes with changes in relative humidity.

5. The apparatus as defined in claim 4 and having a boiling water treated oriented nylon tape which exhibits increased sensitivity and amount of dimensional changes of said tape with changes in relative humidity.

6. The heater control apparatus as defined in claim 1 wherein said first thermostat is sensitive to small temperature changes and is positioned to the rear and exterior of said instrument box and said second thermostat is less sensitive to temperature changes and is positioned in said instrument box, said single displacement switch being a mercury switch, said mercury switch being mounted on the perimeter of said second thermostat, said thermostats being attached to the opposite ends of a shaft member extending substantially from the front to the rear of said apparatus, said shaft being rotatably fastened within a hollow sleeve and extending axially therethrough, said sleeve joining said framework and said instrument box, the said first thermostat being held by a bracket, said bracket also being fastened to a hub which is firmly attached to the outside wall of said hollow sleeve near its end adjacent said first thermostat, said humidistat connected to said hub and providing during operation for rotation of said hub and hollow sleeve with changes in humidity, and, said hollow sleeve having said moisture indexing indicator affixed thereto, said sleeve being fastened to said framework such that as said moisture indexing indicator is moved both of said thermostats and said humidistat are rotated.

7. The apparatus as defined in claim 6 wherein said first and second thermostats are rigidly attached to said shaft member and said first thermostat and said humidistat are positioned in the framework and to the rear of said instrument box, said humidistat rotating both of said first and second thermostats.

References Cited

UNITED STATES PATENTS

| | | | |
|---|---|---|---|
| 2,584,727 | 2/1952 | Mellen | 34—225 |
| 2,855,697 | 10/1958 | Barre | 34—46 |
| 3,067,523 | 12/1962 | Teigen | 34—50 X |
| 3,110,442 | 11/1963 | Taylor | 34—50 X |
| 3,217,424 | 11/1965 | Johnson et al. | 34—50 X |
| 3,386,183 | 6/1968 | Reynolds | 34—48 |

JOHN J. CAMBY, Primary Examiner

U.S. Cl. X.R.

34—50; 200—61.06; 337—3

PO-1050
(5/69)

UNITED STATES PATENT OFFICE
CERTIFICATE OF CORRECTION

Patent No. 3,484,947          Dated December 23, 1969

Inventor(s) Bruce W. Engle

It is certified that error appears in the above-identified patent and that said Letters Patent are hereby corrected as shown below:

Col. 2, line 50, delete "and", first word in the line and replace with ---an---; Col. 3, line 11, after "temperature" insert---in the dryer to assure both reducing the moisture---; Col.3, line 32, after "percent" insert a period (.); Col.5, line 12, change "26" to ---36---; Col.7, line 34, change "ad" to ---and---; Col. 9, line 3, change "and" to ---any---

SIGNED AND
SEALED
AUG 25 1970

(SEAL)
Attest:

Edward M. Fletcher, Jr.
Attesting Officer

WILLIAM E. SCHUYLER, JR.
Commissioner of Patents